Feb. 15, 1966 B. R. CARTER 3,234,721
WRAPPING MACHINE FOR REINFORCING HOSE
Filed Oct. 24, 1963 5 Sheets-Sheet 4

INVENTOR:
B. R. CARTER
BY
Lieber & Nilles

INVENTOR:
B. R. CARTER

United States Patent Office 3,234,721
Patented Feb. 15, 1966

3,234,721
WRAPPING MACHINE FOR REINFORCING HOSE
Ben Richard Carter, 128 Preston Road, Chorley, England
Filed Oct. 24, 1963, Ser. No. 318,755
1 Claim. (Cl. 57—13)

The invention concerns an apparatus for reinforcing flexible hose.

This application is a continuation-in-part of my prior application Serial No. 51,303, filed on August 23, 1960, and now abandoned.

In the art of hose reinforcement it is known to apply a wrapping in the form of a multitude of individual wires helically wound about the hose so as to lie in closely adjacent side by side disposition thereon.

The individual wires of the wrapping of such conventional reinforced hose exhibit a tendency to splay outwardly when the tension in the wires or the restraint applied thereto is removed, and to overcome the effects of such tendency it is usual to apply a braided cover to the hose thus to hold the helical wrapping in position. Such a course is necessary particularly if hose couplings or other fittings are to be applied in order that a more satisfactory anchorage might be provided. The need to provide a braided cover is inconvenient in that it gives rise to an additional manufacturing step but is an acceptable expedient in normal circumstances. However, such conventionally reinforced hoses do present a further unsatisfactory feature which manifests itself more particularly when the hose is to be used to convey pressures lying in the higher pressure ranges. It is found that a repeated flexing of the hose may cause adjacent wires of a given layer to ride one upon another and to become held in such displaced positions. A displacement of the wires in this manner will give rise to a weak spot in the hose in that the substantially continuous layer of reinforcing material will be broken, and in consequence the possibility of failure of the hose is increased.

It is the primary object of the present invention to provide an improved apparatus for manufacturing a reinforced, flexible hose.

The present invention is predicated upon the appreciation that by imparting an amount of back twist into the individual wires, which expression is to be construed as to extend to reinforcing threads also, during application thereof to the hose not only will the inherent tendency of the wrapping to splay outwardly be avoided, but, more important, the incidence of overlying will be reduced or eliminated.

According to the present invention, a method of applying a protective cover to a pressure hose includes the step of simultaneously applying a multiplicity of individual wires about the hose in closely adjacent helically wound side by side disposition and imparting backtwist into some, at least, of said wires during such application thus to cause said wires to lie substantially inert upon the hose.

It is to be appreciated that the extent to which backtwist is to be applied is dependant upon the character of the threads or wires forming the wrapping, but generally the threads or wires, as they lie upon the hose, are inert thereon or apply a slight radially inwardly directed pressure thereto.

The invention will now be described further, by way of example only, with reference to the accompanying drawings illustrating a machine for producing reinforced hose in accordance with the instant invention.

FIGS. 7a, 7b represent cross-sections of hose wrapped in accordance with the invention.

The invention will be described as using wire for the covering material, but it should be understood that the invention is not limited to any particular type of flexible strands.

Figure 1:
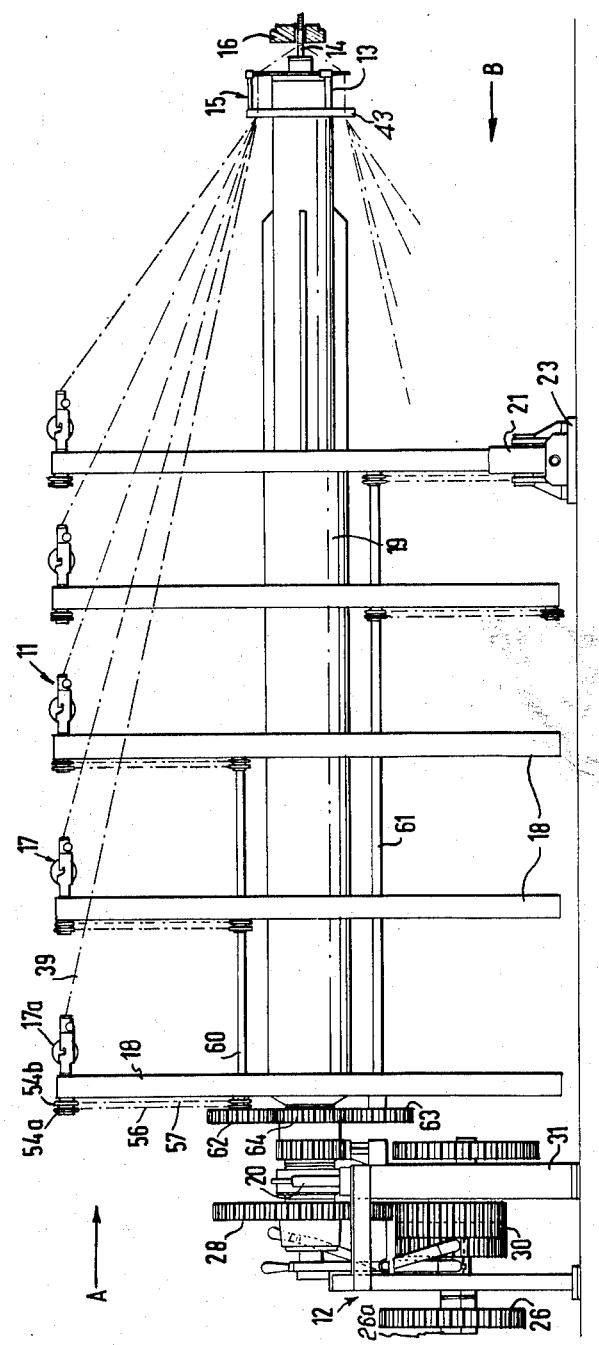
FIG. 1 shows a side elevation of a wrapping machine.
Figure 2:
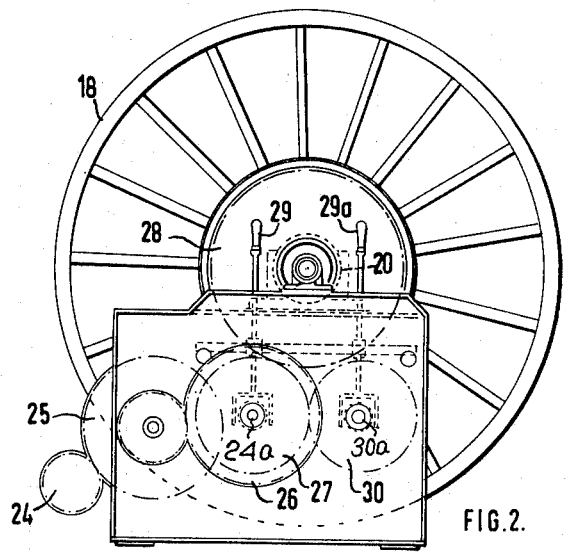
FIG. 2 is a view in the direction of the arrow A of FIG. 1.
Figure 3:
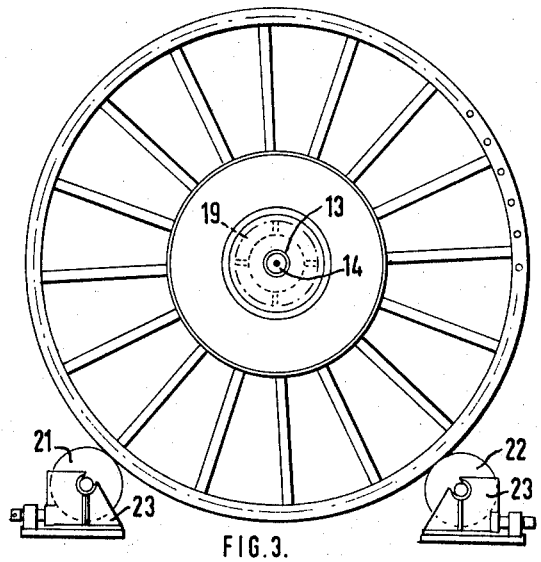
FIG. 3 is a view in the direction of the arrow B of FIG. 1.

Referring now to FIGS. 1 to 3, a wire wrapping machine comprises a carriage 11, means 12 whereby said carriage may be rotated about a horizontal axis longitudinally thereof, a static tube 13 longitudinally of said carriage and coaxial therewith adapted to support a flexible hose 14 to be wrapped, a guide hand 15 mounted upon the carriage 11 for rotation therewith, a die 16 supported adjacent the carriage 11 and coaxial therewith, and a plurality of bobbin holding units in the form of bobbin cradles 17 around the periphery of the carriage.

The carriage 11 consists of some five spoked wheels 18 spaced at equal intervals along a hollow shaft 19 and secured to the shaft for rotation therewith. One end of the carriage 11 is rotatably supported in bearings 20, the other end by rollers 21, 22 contacting the periphery of the wheel furthest from the bearings 20, the rollers 21, 22 being supported in bearings 23 secured to the base of the machine or to the floor, as appropriate.

The driving means for the carriage consists of a main drive gear 24 (FIGURE 2), in constant mesh with a compound gear 25. Gear 25 meshes with another gear 26 carried on a shaft 26a. Gear 27 is splined to shaft 26a so that it is axially shiftable by the shifting yoke-lever 29. Gear 28 is fixed to an extension 19a of hollow shaft 19. A wide gear 30 is axially shiftable by yoke-lever 29a on a layshaft 30a.

The axially shiftable gear 27 can selectively engage either gear 28 or gear 30. When gears 27 and 28 are in mesh the carriage 11 is rotated in the forward or normal direction.

When gears 27 and 30 are in mesh and gear 30 has been shifted to also engage gear 28, then the carriage is rotated in the reverse direction.

The various gear wheels are carried by shifts supported in suitable bearings in the machine framework 31.

Figure 4:
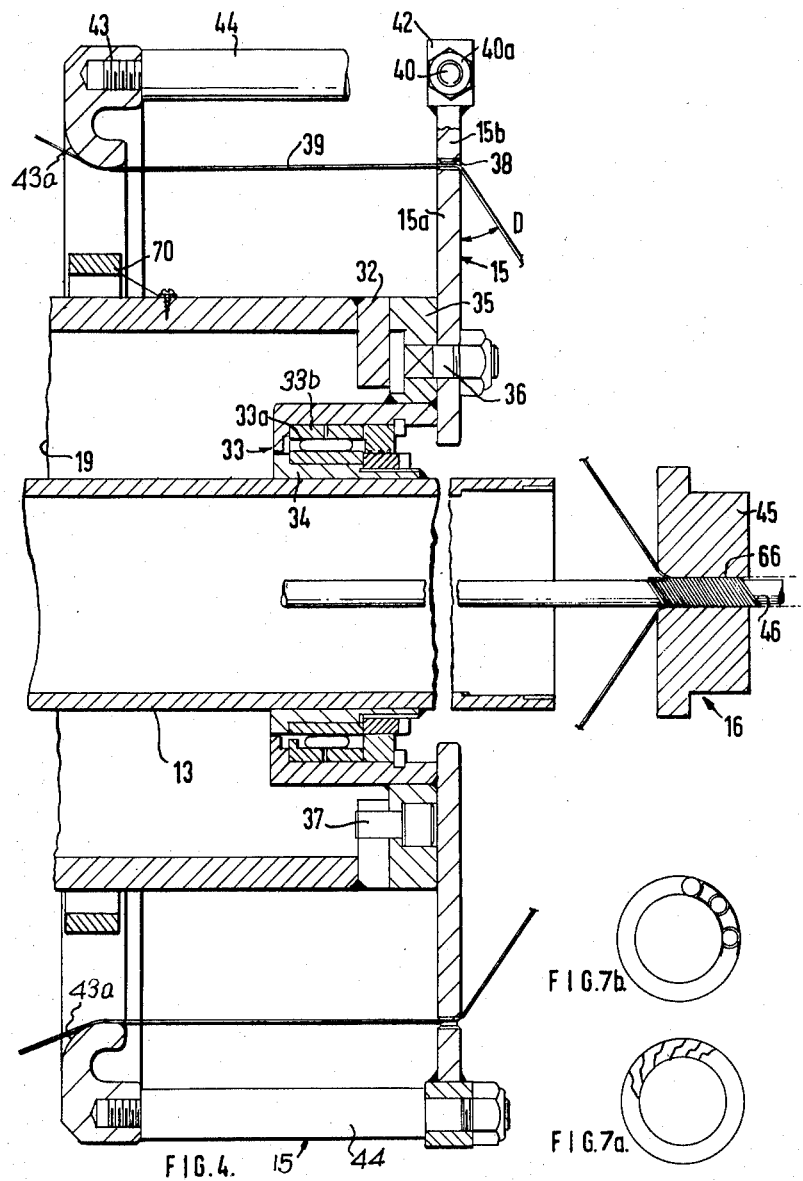
FIG. 4 is a cross-section along line IV—IV of FIG. 3.

Referring now more particularly to FIG. 4, the static tube 13 is disposed longitudinally of and in the hollow shaft 19 and is maintained coaxial therewith by means of an annular flange 32 welded to the open end of the said shaft 19 and carrying secured thereto the outer member 33a of a ball race assembly 33, the inner race member 33b being supported by a collar 34 welded to the outer periphery of the tube 13. The annular flange 32 also has secured thereto the guide head 15, said head 15 being secured to an annular disc 35 by means of bolts 36, said disc itself being held in position on flange 32 by bolts 37.

The guide head 15 is in the form of an annular plate and is formed from two coaxial annular discs 15a, 15b placed with their planes parallel, the outside diameter of the smaller disc 15a being slightly less than the inside diameter of the larger disc 15b, the annular space therebetween receiving tungsten carbide eyelets 38 through which the individual wires 39 from the bobbins 17a on the bobbin cradles 17 pass. The number of eyelets 38 is dependent upon the number of bobbins in use and in the present embodiment some forty-eight bobbins (not all shown) on each of five wheels are provided. For convenience the outer annular disc 15b of the guide head 15 is in three parts, each subtending some 120° to the centre of the head, the parts being held together by nuts 40 and co-operating bolts 40a, said bolts passing through holes 41 in lugs 42 on said parts.

Supported by the head and spaced therefrom in the direction of the carriage is a hardened steel annular disc 43, said disc 43 being secured to the guide head 15 by rods 44. The inner periphery of the disc 43 is bevelled as at 43a, and is preferably chromium plated and is of a diameter similar to the diameter of the ring eyelets carried by the guide head 15.

The die 16 is spaced from the discharge end of the static tube 13 and comprises a disc 45 having a central hole 46 axially thereof supported by a suitable framework (not shown). The diameter of the hole 46 is determined by the outside diameter of the hose when wrapped.

Figure 5:
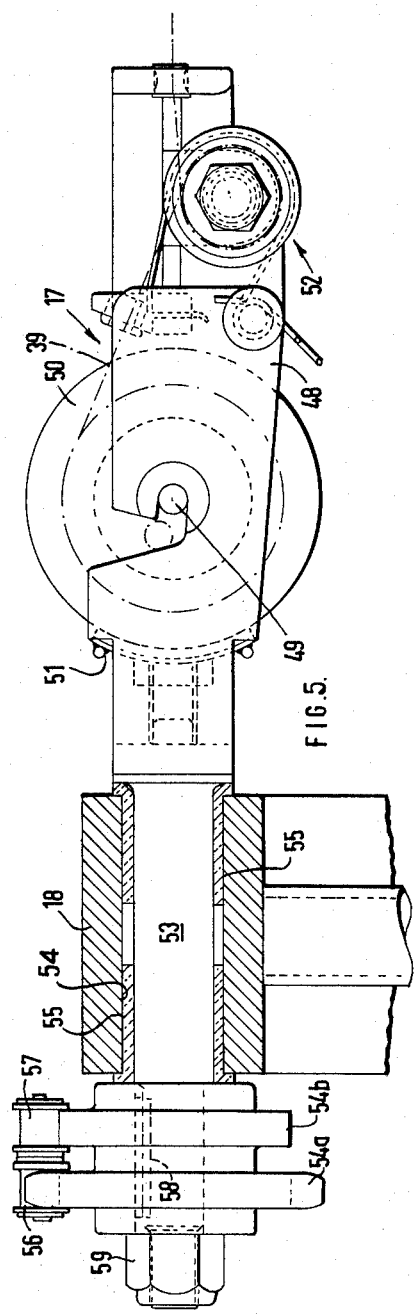
FIG. 5 is a side elevation, partly in cross-section, of a bobbin cradle.

Around the periphery of each spoked wheel 18 is provided a plurality of bobbin cradles 17 (some only of such cradles being shown), FIG. 5, each cradle comprising a body part 48, shaft means 49 whereby a bobbin 50 may be rotatably supported upon said body part, retaining means 51 whereby said body may be held in position, and tension applying means 52 whereby the wire 39 may be drawn from the bobbin under a predetermined tension, said applying means being adapted to permit a variation in the applied tension as and when required.

Extending rearwardly from the base 17a of the cradle is a spindle 53 located in through holes 54 adjacent the periphery of the wheels 18. Bushings 55 are provided between the spindle and the wheels. The remote end of the spindle 53 carries the sprocket wheels 54a, 54b of a duplex chain system, the chains of said system being represented by reference numbers 56, 57. The sprocket wheels 54a, 54b are keyed at 58 to the spindle and are held in position by a nut 59. The drive to each duplex chain system is through a shaft 60 serving the three wheels nearest to the input end of the machine and through a shaft 61 serving the remaining wheels. Both shafts 60, 61 carry a pinion wheel 62, 63 respectively at the end thereof, which are in constant mesh with gear wheel 64 secured to the hollow shaft 19.

Prior to operating the machine, a hose to be wrapped is passed through the static tube 13 to the die 16 and thence to a haul-off machine (not shown).

Upon rotation of the carriage 11 about a horizontal axis and the simultaneous continued hauling-off of the hose 14 by the haul-off machine (not shown), a wire covering 66 comprising a plurality of ends 39 in side by side disposition will be applied to the hose, the density of the covering being determined by the total number of bobbin cradles 17 carried by the machine. The angle D through which the wire is deviated upon passage through the die is important in that such change of angle, approximately 15°–20° together with the backtwist applied to the wire, ensures that the wires will lie inert on the hose. The provision of duplex chain systems ensures that the bobbin carriers rotate about their own longitudinal axes as the carriage itself rotates and the rate of rotation in relation to the rotations of the carriage 11 is such that wire may be drawn from the bobbins in an untwisted state if required. By suitably selecting the rate and direction of rotation of the carriers various degrees of twist can be introduced to suit particular requirements.

In FIG. 1 there is a 1:1 ratio in respect of the pinion wheels 62, 63 and the complementary wheel 64 thus each cradle is rotated once about its own axis for each full rotation of the carriage 11. Thus no twist is introduced in the wires 39 by virtue of the rotation of the carriage, the wires lying inert upon the hose.

Figure 6:
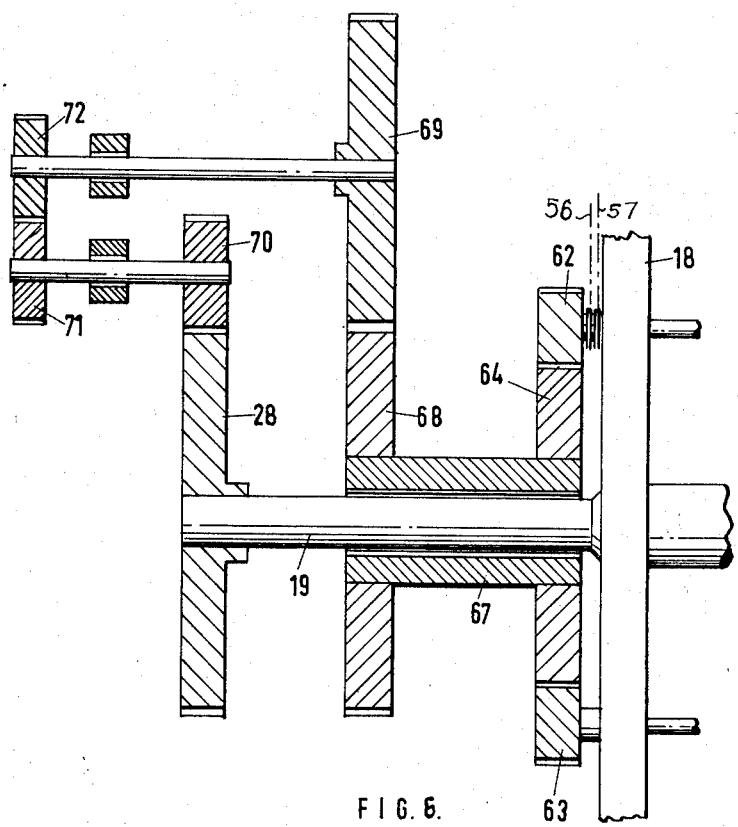
FIG. 6 shows, diagrammatically, a modification of the drive for the machine illustrated in FIGS. 1 and 2.

If it is required to remove twist or to apply backtwist to the wire then the drive arrangement diagrammatically illustrated in FIG. 6 may be used. In this case the complementary pinion wheel 64 is mounted on a sleeve 67 which is freely rotatable upon the end of the shaft 19, said sleeve 67 being adapted to be rotated by virtue of the engagement between a pinion wheel 68 keyed to the sleeve 67 and a driving pinion 69, the latter being driven from the gear 28 through pinions 70, 71 and 72. By means of an appropriate selection of gear ratios any required rate of rotation of the bobbin cradles may be obtained.

The direction of motion of the carriage 11 and bobbin carriers 17 may be reversed in order to apply a covering having an opposite direction of lay upon the hose.

In an alternative form of machine, not illustrated, the wheel-like members take the form of annular flanges extending from a cone-shaped body, successive flanges towards the haul-off end of the machine being of lesser outside diameter.

By virtue of the conical form of the machine a more direct run of wires from the bobbin to the wrapping head is possible. Furthermore, a more compact machine is obtainable.

Such a machine as we have described may equally well be used to apply a covering consisting of adjacent interlocking steel wires instead of the non-interlocking arrangement described in relation to the specific description of the preferred embodiment.

Reference is particularly directed to FIGS. 7a and 7b which show cross sections of hose having an armoured covering therefor. The sectional wires can be of the full lock type as indicated in FIGS. 7a or of the half lock type as shown in FIG. 7b.

When required for high pressure purposes it may be advantageous to apply a plurality of layers of wire to the hose and in such circumstances adjacent layers will have opposite directions of lay and will preferably have a hard-bedding tape therebetween. It has been found that an angle of approximately 54° between the axis of the hose and the individual wires thereupon produces excellent results. In order to fix the adjacent wires in position a wire binding solution can be applied, such application rendering easier the fitting of various ancillary components thereto.

The successive covers may be applied in subsequent operations by re-passing the wire through the machine or may all be applied simultaneously by providing additional carriages.

Further, the hose may have a braided cover before and/or after the provision of the wire covering, braiding heads being provided for use in conjunction with the wrapping machine to achieve this end.

A hose wrapped in accordance with the present invention will have a covering which will allow of the use of the hose for transmitting fluids under pressures far in excess of those possible with conventional hose. I have found in practice that the hose wrapped in accordance with my invention has a far longer life than has a hose wrapped by conventional methods and from tests carried out would estimate that my hose is better by a factor of the order of ten than known hose at least in so far as impulse testing is concerned.

Various modes of carrying out the invention are contemplated as being within the scope of the following claim particularly pointing out and distinctly claiming the subject matter which is regarded as the invention.

What is claimed and desired to be secured by Letters Patent:

A flexible material wrapping machine comprising a rotatable sleeve having a plurality of generally circular carriages fixed to said sleeve and axially spaced there-along for rotation therewith, a plurality of bobbin holding units rotatably mounted around the periphery of said carriages for bodily rotation therewith, a stationary tube extending longitudinally within said sleeve and about the axis of which said sleeve and carriage rotate, said tube adapted to have a hose member to be wrapped pass therethrough, a guide head adjacent the discharge end of said stationary tube and mounted for rotation with the sleeve and carriage and adapted to provide a guide for flexible material passing from said bobbin units to said hose member, a rotatably driven shaft mounted on said carriages for bodily rotation therewith around said tube, and flexible endless drive members between said shaft and said bobbin holding units for rotating the latter about their individual axis in a direction to cause definite backtwist in said flexible material.

References Cited by the Examiner

UNITED STATES PATENTS

| | | | |
|---|---|---|---|
| 83,132 | 10/1868 | Coles et al. | 156—432 X |
| 727,751 | 5/1903 | Coriasco | 57—65 X |
| 1,093,053 | 4/1914 | Horn | 57—65 |
| 1,788,641 | 1/1931 | Sunderland | 57—65 |
| 1,907,744 | 5/1933 | Craig | 57—65 X |
| 2,208,914 | 7/1940 | Van Hook | 57—15 |
| 2,732,884 | 1/1956 | Vanzo | 57—15 X |
| 3,138,511 | 6/1964 | Cadwallader | 57—15 X |

FOREIGN PATENTS

| | | |
|---|---|---|
| 1,205,455 | 8/1959 | France. |
| 1,111,254 | 7/1961 | Germany. |

MERVIN STEIN, *Primary Examiner.*